United States Patent
Cho et al.

(10) Patent No.: US 8,637,153 B2
(45) Date of Patent: *Jan. 28, 2014

(54) METHOD FOR PREPARING CERIUM CARBONATE AND CERIUM OXIDE

(75) Inventors: Jun-Yeon Cho, Daejeon (KR);
Sang-Soon Choi, Daejeon (KR);
Seung-Beom Cho, Daejeon (KR)

(73) Assignee: LG Chem, Ltd., Seoul (KR)

(*) Notice: Subject to any disclaimer, the term of this patent is extended or adjusted under 35 U.S.C. 154(b) by 192 days.

This patent is subject to a terminal disclaimer.

(21) Appl. No.: 13/021,464

(22) Filed: Feb. 4, 2011

(65) Prior Publication Data

US 2011/0244237 A1     Oct. 6, 2011

(30) Foreign Application Priority Data

Feb. 5, 2010   (KR) .................. 10-2010-0010820

(51) Int. Cl.
*B32B 5/16*     (2006.01)

(52) U.S. Cl.
USPC .......................... 428/402; 423/421; 423/263

(58) Field of Classification Search
USPC ................... 428/402; 423/421, 263
See application file for complete search history.

(56) References Cited

U.S. PATENT DOCUMENTS

2007/0107318 A1*   5/2007  Oh et al. ................... 51/307

FOREIGN PATENT DOCUMENTS

| CN | 1607180 A | 4/2005 |
|---|---|---|
| CN | 101006153 A | 7/2007 |
| CN | 101304947 A | 11/2008 |
| WO | 2010/013913 A2 | 2/2010 |

OTHER PUBLICATIONS

Preparation and properties of monodispersed colloidal particles of lanthanide compounds . . . Egon Matijevic et al. Jurnal of colloid and interface science, vol. 118, No. 2 (Aug. 1987), p. 506-523.*

* cited by examiner

*Primary Examiner* — Leszek Kiliman
(74) *Attorney, Agent, or Firm* — Rothwell, Figg, Ernst & Manbeck, P.C.

(57) ABSTRACT

Disclosed is a method for preparing cerium carbonate that can improve yield or productivity of cerium carbonate and enables preparation of cerium carbonate having uniform diameter, cerium carbonate, and a method for preparing cerium oxide.

The method for preparing cerium carbonate comprises mixing the cerium precursor with urea; and, elevating the temperature of the mixture to 50° C. or more in the absence of a separate reaction medium to react the cerium precursor with urea in the presence of a polymer dispersant.

16 Claims, 4 Drawing Sheets

US 8,637,153 B2

METHOD FOR PREPARING CERIUM CARBONATE AND CERIUM OXIDE

CROSS REFERENCE TO RELATED APPLICATIONS

This application claims priority from Korean patent application No. 10-2010-0010820 filed on Feb. 5, 2010, all of which is incorporated herein by reference in its entirety for all purposes.

BACKGROUND OF THE INVENTION (a) Field of the Invention

The present invention relates to a method for preparing cerium carbonate that can improve yield or productivity of cerium carbonate and enables preparation of cerium carbonate having uniform diameter, cerium carbonate, and a method for preparing cerium oxide.

(b) Description of the Related Art

Cerium oxide powder is a high functional ceramic material widely used as a catalyst, a phosphor, cosmetics, an abrasive, etc., and it has been recently spotlighted as an abrasive for a CMP (Chemical Mechanical Polishing) process in the field of semiconductor device.

In general, the cerium oxide powder can be prepared by a liquid-phase method, a gas-phase method or a solid-phase method.

According to the liquid-phase method, a pH control agent such as ammonia is added to starting material, i.e., trivalent or tetravalent cerium salt to directly prepare cerium oxide from cerium salt. Although this method is economical because raw material cost and equipment cost is comparatively low, it is difficult to control particle growth because a reaction between starting materials easily occurs from nucleation stage. And, if fine cerium oxide prepared by the liquid-phase method is used as an abrasive, a polishing rate is low thus unfavorable for a continuous process to decrease productivity.

According to the gas-phase method, a cerium metal salt precursor is vaporized and then bonded with oxygen, etc. to directly prepare cerium oxide. This method includes flame combustion decomposition, gas condensation decomposition, plasma vaporization, laser vaporization, etc. However, this method has difficulty in terms of massification because costs of the cerium metal salt precursor and equipment are high, and the study thereof is still under progress.

Meanwhile, according to the solid-phase method, precursor material is fired at high temperature to prepare cerium oxide. As the precursor, cerium carbonate is widely used, and the physical properties and shape of cerium oxide can be varied depending on the kind and shape of cerium carbonate. Thus, in order to control the physical properties (for example, polishing performance of cerium oxide, etc,) or shape, etc. of cerium oxide, a method for preparing cerium carbonate that can easily control the kind or shape of cerium carbonate is required.

However, a method for preparing cerium carbonate with simply controlling the kind, shape or size has not been sufficiently developed yet, and diameter of cerium carbonate obtained by the existing preparation method has insufficient uniformity of diameter.

Moreover, a method for preparing cerium carbonate known so far has a disadvantage of insufficient yield or productivity, and in case cerium carbonate with a specific shape or crystal structure such as orthorhombic structure is to be obtained, a high pressure reaction is required, which involves dangerousness.

SUMMARY OF THE INVENTION

Accordingly, the present invention provides a method for preparing cerium carbonate that can improve yield or productivity of cerium carbonate and enables preparation of cerium carbonate having uniform diameter, and cerium carbonate.

Also, the present invention provides a method for preparing cerium oxide using the preparation method of cerium carbonate.

The present invention provides a method for preparing cerium carbonate comprising: mixing a cerium precursor and urea; and, elevating the temperature of the mixture to 50° C. or more in the absence of a separate reaction medium to react the cerium precursor with urea in the presence of a polymer dispersant.

The present invention also provides cerium carbonate comprising 50 vol % or more of orthorhombic or hexagonal cerium carbonate, and having volume mean diameter of 60~120 nm, preferably 60~80 nm or 80~90 nm, and standard deviation of diameter of 4~10 nm, preferably 3~7 nm.

The present invention also provides a method for preparing cerium oxide comprising forming cerium carbonate by the above method; and firing the cerium carbonate.

DETAILED DESCRIPTION OF THE EMBODIMENTS

Figure 1:
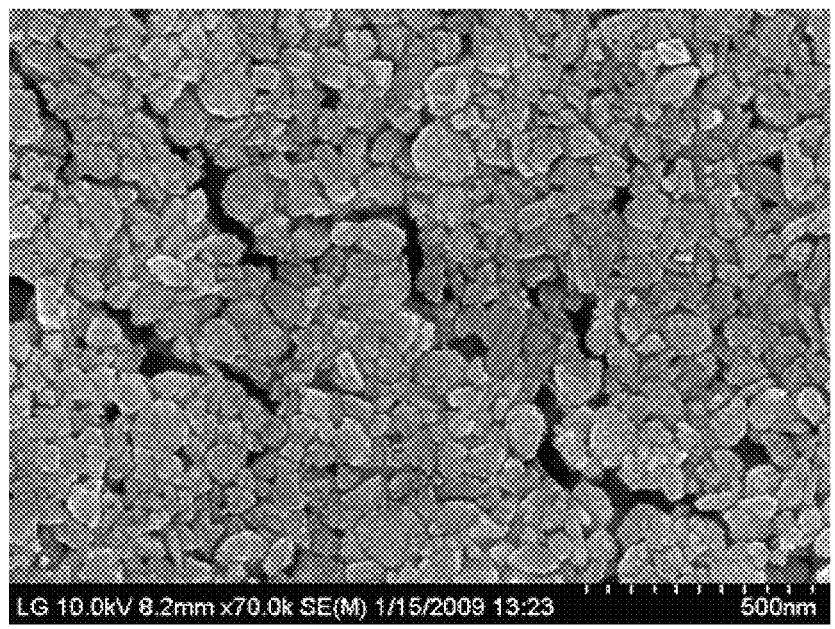
FIG. 1 is a magnified SEM image of cerium carbonate obtained in Example 1.

Hereinafter, a method for preparing cerium carbonate, cerium carbonate, and a method for preparing cerium oxide according to specific embodiments of the invention will be explained.

According to one embodiment of the invention, provided is a method for preparing cerium carbonate that comprises mixing a cerium precursor and urea; and, elevating the temperature of the mixture to 50° C. or more in the absence of a separate reaction medium to react the cerium precursor with urea in the presence of a polymer dispersant.

In the method for preparing cerium carbonate, the "reaction medium" refers to a solvent, an aqueous solvent or other liquid medium used to dissolve a reactant including the cerium precursor, urea and the polymer dispersant at an elevated temperature condition under which the cerium precursor and urea react, for example, at a temperature of 50° C. or more. The reaction medium may include water, or an alcohol type solvent such as ethanol or ethylene glycol that can dissolve the cerium precursor and urea under the elevated temperature condition.

And, the reacting "in the absence of (a separate) reaction medium" means that a separate "reaction medium" different from the reactants including the cerium precursor, urea and the polymer dispersant, i.e., a solvent, an aqueous solvent or other liquid reaction medium for dissolving the reactants is not added during the process of mixing and reacting the reactant. However, even "in the absence of (a separate) reaction medium", a small quantity of water or other liquid mediums derived from air or a cerium precursor in the form of hydrate may be included in the reactant, and in case an additive such as nitric acid and the like is added to the reactant and a reaction is progressed, a small quantity of an aqueous solvent or other liquid mediums may be included for dissolving the additive.

Therefore, the "absence of (a separate) reaction medium" may include the case wherein an organic solvent such as an alcohol type solvent, an aqueous solvent such as water, or other liquid medium is included in a small quantity of 20 wt % or less, preferably 10 wt % or less, most preferably 5 wt % or less, based on the total weight of the reactants, in the reactants including the cerium precursor, urea and the polymer dispersant, and optionally an additive such as nitric acid and the like, during the process of mixing and reacting the reactants, as well as the case wherein it is not included in the reactants.

In the method for preparing cerium carbonate according to one embodiment, the reactants of the cerium precursor and urea are mixed, and then, the temperature of the mixture is elevated to 50° C. or more in the absence of a separate reaction medium, and a reaction of the cerium precursor and urea is progressed at the elevated temperature in the presence of the polymer dispersant. At this time, for the reaction in the absence of a reaction medium, the cerium precursor and urea may be mixed in a solid state. At least a part of the urea and cerium precursor are molten by the temperature elevation, and the melt acts as a medium to progress a reaction, wherein additional solvent, aqueous solvent or other liquid reaction medium is not substantially used.

If the reaction of the cerium precursor and urea is progressed by the melting of the reactants in the absence of a separate reaction medium, cerium carbonate may be prepared by the reaction therebetween with higher yield. It is expected that since a separate reaction medium such as a solvent or an aqueous solvent and the like is not substantially used, contact between the reactants becomes more frequent in the same volume and thus the reaction occurs more actively. And, since the melt of the reactants may act as a medium, a problem such as disposal of waste water generated when using a separate reaction medium such as a solvent or an aqueous solvent and the like may not be caused.

And, according to the preparation method, since the reactants, i.e., the cerium precursor and urea may be reacted in a greater quantity as much as the reduced amount of a reaction medium in a reactor of the same volume, cerium carbonate may be prepared with higher productivity.

And, in the preparation method, the cerium precursor and urea is reacted in the presence of a polymer dispersant, thus obtaining cerium carbonate having more uniform diameter. It is believed that since the reaction is progressed while the polymer dispersant particles are uniformly dispersed in the melt of the reactants, the reaction of the cerium precursor and urea may wholly uniformly occur in a micro emulsion state, and the uniformly dispersed polymer dispersant particles may prevent non-uniform production or aggregation of cerium carbonate particles. As explained, as cerium carbonate is prepared with more uniform particle diameter, cerium oxide obtained therefrom may also have more uniform micro particle diameter, and exhibit more excellent physical properties, for example, excellent polishing properties as CMP abrasive.

In addition, according to the preparation method of cerium carbonate according to one embodiment of the invention, cerium carbonate may be prepared with easily controlling the crystal structure, shape, kind or size of cerium carbonate. The non-limiting reason therefor is as follows.

In the prior art, cerium carbonate was mainly prepared by elevating the temperature of a reaction mixture to a certain temperature in an aqueous solution state wherein a cerium precursor and urea are dissolved in an aqueous solvent such as water. However, to obtain cerium carbonate of a specific crystal structure, for example, cerium carbonate of an hexagonal crystal structure, a reaction at high temperature exceeding 100° C., for example about 180° C. is required. However, since the boiling point of an aqueous solvent commonly used as a reaction medium is 100° C., a reaction should be progressed under high pressure, for example, 40 bar to maximum 100 bar to obtain cerium carbonate of a specific crystal structure, for example cerium carbonate of an hexagonal crystal structure by progressing the reaction at high temperature while inhibiting the evaporation of the reaction medium. Particularly, since the reaction of the cerium precursor and urea begins to occur when the urea is decomposed at an elevated temperature, the reaction pressure often rises due to the gas pressure by the decomposition of urea.

The reaction under high pressure often involves dangerousness, and requires use of expensive high pressure equipment and the like to decrease economical feasibility. For this reason, it was very difficult in the prior art to selectively prepare cerium carbonate of a specific crystal structure, for example, cerium carbonate of an hexagonal crystal structure, and the economical feasibility was very low.

To the contrary, according to one embodiment of the invention, since a solid mixture of a cerium precursor and urea is reacted while elevating the temperature and melting them without substantially using a separate reaction medium such an aqueous solvent and the like, the reaction is not needed to be progressed under high pressure. Specifically, since the boiling point of the reactants of urea and the like is very high, there is no need to increase pressure in order to increase reaction temperature at a temperature below the carbonization temperature of the reactant. Thus, since the temperature of the reaction mixture may be elevated to 100° C. or more to progress the reaction even under atmospheric pressure, cerium carbonate of a specific crystal structure, for example, cerium carbonate of an hexagonal crystal structure, may be easily selectively prepared.

Therefore, according to one embodiment of the invention, the reaction conditions (for example, reaction temperature, equivalent ratio of the reactants, or reaction time and the like) of the cerium precursor and urea may be easily controlled even under low pressure, for example 1~2 atm, to selectively and efficiently obtain cerium carbonate having a desired crystal structure, kind or shape and the like. And, since there is no need to use a high pressure reactor in this process, economical feasibility may increase, and dangerousness due to the high pressure reaction is not substantially caused.

And, according to the preparation method, the size (particle diameter) of cerium carbonate may be controlled by controlling the molecular weight of the polymer dispersant and the like, thereby easily obtaining cerium carbonate having a desired uniform size. For example, cerium carbonate having finer particle diameter may be uniformly obtained by controlling the molecular weight of the polymer dispersant to be relatively large, and to the contrary, cerium carbonate having relatively large particle diameter may be uniformly obtained by controlling the molecular weight of the polymer dispersant to be small.

Hereinafter, each step of the preparation method of cerium carbonate according to one embodiment will be explained in detail.

In the preparation method of cerium carbonate according to one embodiment of the invention, the cerium precursor used as a reactant may include cerium nitrate, sulfate, chloride, acetate or ammonium salt and the like, and besides, various compounds comprising cerium and maintaining a solid phase at room temperature (for example, at −20~40° C.) may be used as the cerium precursor without specific limitation. For example, cerium salt comprising tri-valent or tetra-valent cerium may be used as the cerium precursor. Specific examples of the cerium precursor may include cerium nitrate ($Ce(NO_3)_3 \cdot xH_2O$), cerium sulfate ($Ce(SO_4)_3 \cdot xH_2O$ or $Ce(SO_4)_2 \cdot xH_2O$), cerium chloride ($CeCl_3 \cdot xH_2O$), cerium acetate, or diammonium cerium nitrate ($Ce(NH_4)_2(NO_3)_6$ or $Ce(NH_4)_2(NO_3)_5 \cdot xH_2O$) (wherein, x is a constant of 0~10).

And, urea ($CO(NH_2)_2$) reacting with the cerium precursor may function as a carbon source providing carbonate ion ($CO_3^{2-}$) and a pH control agent.

The cerium precursor and urea may be mixed in the equivalent ratio of the cerium precursor:urea of about 1:0.5~1:10, preferably about 1:1~1:10, more preferably about 1:2~1:5, most preferably about 1:3. If the equivalent ratio of urea is too small, at least a part of the cerium precursor may be unreacted to decrease yield of cerium carbonate, and if the equivalent ratio of urea is too large, an excessive reactant may be generated in a large quantity to lower purity of cerium carbonate.

And, after mixing the cerium precursor and urea, the temperature of the mixture is elevated to about 50° C. or more, preferably about 50~250° C., more preferably about 80~250° C., most preferably about 120~150° C. Since the cerium precursor and urea may be appropriately molten, for example, at about 80° C. or more, preferably about 120° C. or more and the melt may act as a medium, the reaction of the cerium precursor and urea may efficiently occur within the above temperature range. And, in case an additive such as nitric acid is used, since the melting temperature of the cerium precursor and urea may be lowered, the melt of the reactants may act as a medium to cause the reaction of the cerium precursor and urea even at 50° C. or more.

And, the step of elevating the temperature of the mixture and reacting in the presence of a polymer dispersant may comprise elevating the temperature of the mixture, and adding a polymer dispersant to the temperature-elevated mixture to react the cerium precursor and urea. Specifically, in this step, after elevating the temperature of the mixture, the polymer dispersant may be added to progress the reaction. By adding the polymer dispersant after elevating temperature, the polymer dispersant may be uniformly dispersed in the melt of the cerium precursor and urea to obtain cerium carbonate having more uniform particle diameter.

At this time, the polymer dispersant added to the temperature-elevated reaction mixture may include any polymer that may be uniformly dispersed in the melt of the cerium precursor and urea. Specific examples of the polymer dispersant may include polyethylene glycol, polyacrylic acid, polyvinyl alcohol, polyvinylpyrrolidone, or a mixture thereof, and besides, any polymer that may be uniformly dispersed n the melt of the reactant may be used.

And, the polymer dispersant may have weight average molecular weight of about 200 to 100000, preferably about 300 to 50000, more preferably about 300 to 10000. By using the polymer dispersant having the above molecular weight range, cerium carbonate having suitable and uniform particle diameter may be easily obtained, and cerium oxide having excellent physical properties (for example, excellent polishing performance as an abrasive for CMP slurry) may be obtained therefrom.

And, by controlling the molecular weight of the polymer dispersant within the above range, the particle diameter of the produced cerium carbonate may be controlled to easily obtain cerium carbonate having desired particle diameter. For example, cerium carbonate having relatively large volume mean diameter of about 80~120 nm may be obtained by controlling the weight average molecular weight of the polymer dispersant to be relatively small in the range of about 200 or more, specifically about 20~600, and cerium carbonate having relatively small volume mean diameter of about 60~80 nm may be obtained by controlling the weight average molecular weight of the polymer dispersant to be large as about 1000 or more, properly about 1000~100000, preferably about 1000~10000.

And, the polymer dispersant may be used in the content of about 10 to 30 wt %, preferably about 15 to 25 wt % based on the weight of the cerium precursor. If the polymer dispersant is used in the above content, cerium carbonate having uniform diameter may be efficiently prepared, and there will be no concern for inhibition of the reaction of the cerium precursor and urea by the polymer dispersant. In addition, the diameter of cerium carbonate may be controlled by controlling the amount of the polymer dispersant. For example, cerium carbonate having relatively large volume mean diameter of about 80~120 nm may be obtained by controlling the content of the polymer dispersant to be relatively small in the range of about less than 20 wt %, specifically about 10 wt % to less than 20 wt %, and cerium carbonate having relatively small volume mean diameter of about 60~80 nm may be obtained by controlling the content of the polymer dispersant to be large in the range of about 20 wt % or more, specifically about 20 to 30 wt %.

Meanwhile, in the method according to one embodiment, the reaction of the cerium precursor and urea in the presence of the polymer dispersant may be conducted under pressure of about 1~3 atm, preferably about 1~2 atm, most preferably about atmospheric pressure. In the method, since a separate reaction medium such as an aqueous solvent is not used, a high pressure reaction for inhibiting evaporation of the reaction medium is not required even in case hexagonal cerium carbonate is to be prepared at high temperature. Therefore, the reaction of the cerium precursor and urea may be conducted under relatively low pressure, and there is little concern for additional increase in the pressure of the reaction system by evaporation of the reaction medium. Thus, cerium carbonate having a desired crystal structure, kind or shape may be easily prepared by easily controlling the reaction conditions under low pressure.

And, the reaction time of the cerium precursor and urea may be controlled within about 0.5~60 hours, preferably about 6~12 hours. If the reaction is conducted for the above time period, the reaction degree of the cerium precursor and urea may be appropriately controlled to economically prepare cerium carbonate with high yield. However, the reaction time may be controlled to be suitable for the mixing equivalent ratio of the cerium precursor and urea or reaction temperature, considering the crystal structure, kind or shape of cerium carbonate to be obtained.

And, during the reaction of the cerium precursor and urea, water derived from the cerium precursor in the form of hydrate may be removed. In the preparation method, in some cases, the cerium precursor such as cerium salt that is use as a reactant may be in the form of hydrate. However, if the reactant in the form of hydrate is used, water may be generated from the reactant during the reaction, and internal temperature of the reactant may not easily increase due to the water. In such as case, since the reaction efficiency of the cerium precursor and urea may be lowered, water may be continuously removed during the reaction to further improve the reaction efficiency.

Meanwhile, in the preparation method, the reaction of the cerium precursor and urea may be conducted in the presence of nitric acid. If the nitric acid is added, the melting temperature of the cerium precursor and urea may be lowered, and the decomposition initiation temperature of urea may be lowered, thus lowering the reaction temperature of the cerium precursor and urea. Specifically, if the nitric acid is added, the cerium precursor and urea may be appropriately molten and act as a medium, for example, at a temperature of about 50° C. or more, preferably about 50~250° C., more preferably about 50~150° C., and urea may be decomposed to react with the cerium precursor at the above temperature, thus lowering the reaction temperature. Most preferable reaction temperature may be about 120~150° C.

The nitric acid may be added in the aqueous solution state dissolved in a small amount of an aqueous solvent for easy and uniform addition to the solid reaction mixture comprising the cerium precursor and urea. However, the aqueous solvent is just a small amount of medium for dissolving nitric acid, and the medium is not used in the amount capable of acting as a reaction medium of the cerium precursor and urea. Specifically, it may be included in a small amount of 20 wt % or less, preferably 10 wt % or less, more preferably 5 wt % or less, based on the total weight of the reactant including the cerium precursor, urea, the polymer dispersant, and nitric acid.

The nitric acid may be added in the equivalent ratio of urea:nitric acid of about 1:4 or less, preferably about 1:1 to 1:3. If the amount of nitric acid exceeds the above range, the produced cerium carbonate may be redissolved in nitric acid and the crystal may not be maintained to lower yield of cerium carbonate, and it may be difficult to prepare cerium carbonate having a desired crystal structure or shape.

Meanwhile, in the preparation method of cerium carbonate, cerium carbonate having a desired crystal structure, kind or shape may be easily selectively prepared by controlling the reaction conditions such as reaction temperature, mixing equivalent ratio of the cerium precursor and urea, or reaction time. And, cerium carbonate having a desired size (diameter) may be selectively prepared by controlling the molecular weight or amount of the polymer dispersant.

More specifically, the cerium carbonate obtained by the above explained preparation method may be divided into orthorhombic cerium carbonate represented by the Chemical Formula of cerium oxycarbonate hydrate ($Ce_2O(CO_3)_2 \cdot H_2O$), and hexagonal cerium carbonate represented by the Chemical Formula of cerium hydroxyl carbonate ($Ce(OH)(CO_3)$), and the production degree of each crystal structure or the shape of cerium carbonate may be controlled by controlling the reaction conditions.

For example, if the mixing equivalent ratio of the cerium precursor and urea is maintained low (i.e., urea is used in a relatively small equivalent ratio), or reaction temperature is maintained at a temperature of less than about 140° C., orthorhombic cerium carbonate may be predominantly prepared rather than hexagonal cerium carbonate. To the contrary, if the mixing equivalent ratio of the cerium precursor and urea is maintained high (i.e., urea is used in a relatively large equivalent ratio) or reaction temperature is maintained high at a temperature of about 140° C. or more, hexagonal cerium carbonate may be predominantly prepared. And, in case nitric acid is used, a temperature at which the hexagonal cerium carbonate is predominantly prepared may be lowered, and thus, orthorhombic cerium carbonate may be predominantly prepared at a reaction temperature of less than about 100° C., and hexagonal cerium carbonate may be predominantly prepared at a temperature of about 100° C. or more.

Also, the crystal structure or shape of cerium carbonate may be controlled by controlling the reaction time of the cerium precursor and urea. For example, if the reaction time of the cerium precursor and urea for preparation of cerium carbonate is controlled to be relatively short as less than about 3 hours, orthorhombic cerium carbonate may be predominantly prepared, and to the contrary, if it is controlled to be long as about 3 hours or more, hexagonal cerium carbonate may be predominantly prepared.

And, as explained, the diameter of cerium carbonate may be controlled by controlling the molecular weight or the amount of the polymer dispersant. For example, cerium carbonate having volume mean diameter of about 80~120 nm may be obtained by controlling the weight average molecular weight of the polymer dispersant to about 200~500 or controlling the content to about less than 20 wt % of the cerium precursor, and cerium carbonate having volume mean diameter of about 60~80 nm may be obtained by controlling the weight average molecular weight to about 1000 or more, properly about 1000~100000, or controlling the content to about 20 wt % or more.

Meanwhile, it is preferable that the cerium carbonate prepared by the above explained method further may go through separation:washing: and drying. The separation may be conducted by a common method, for example, cooling separation, filter separation, or centrifugal separation, and thereby, unreacted urea and the polymer dispersant and the like may be separated. And, the washing may be preferably conducted using DI water so that ion value may become 3 mS or less. Thereby, the separated unreacted urea or dispersant may be removed, and in case cerium oxide is to be obtained by firing cerium carbonate, the crystal size of the powder may be appropriately controlled after firing, and problems due to pulverization may be prevented. Meanwhile, the drying may be conducted at about 60° C. or more, preferably about 70~90° C. for about 12~36 hours, preferably about 18~30 hours, most preferably about 24 hours, but the time may be varied as the drying temperature may be varied according to the moisture content.

Cerium carbonate in the form of white powder may be obtained after the drying process.

According to the above-explained preparation method of cerium carbonate, cerium carbonate may be obtained with high yield and productivity. And, cerium carbonate having desired crystal structure, kind, shape or size (diameter), for example, cerium carbonate of an orthorhombic or hexagonal crystal structure having desired uniform particle diameter may be easily selectively obtained by controlling the reaction conditions.

According to another embodiment of the invention, cerium carbonate obtained by the above explained preparation method is provided. The cerium carbonate may comprise cerium carbonate of an orthorhombic or hexagonal crystal structure in an appropriate ratio, and it may comprise one of them in the content of 50 vol % or more. And, it may have volume mean diameter of about 60~120 nm, preferably about 60~80 nm or about 80~90 nm, and standard deviation of diameter of about 4~10 nm, preferably about 3~7 nm.

Specifically, since the crystal structure and diameter of cerium carbonate may be easily controlled during the preparation process to obtain cerium carbonate having desired crystal structure, kind, shape and size, cerium oxide having desired physical properties, shape and size may be easily obtained from the cerium carbonate. For example, cerium oxide satisfying physical properties and shape as CMP abrasive may be easily obtained from the cerium carbonate prepared by the above method.

And, since the cerium carbonate may have more uniform diameter by the action of the polymer dispersant, compared to those already known, the standard deviation of diameter may decrease to about 4~10 nm, preferably about 3~7 nm. Therefore, cerium oxide having more uniform diameter may be obtained from the cerium carbonate, and the cerium oxide may exhibit excellent physical properties, for example, excellent polishing property as CMP abrasive. In addition, since the cerium carbonate and cerium oxide obtained therefrom have more uniform diameter, a process of pulverizing cerium oxide to a desired diameter may be largely simplified.

Meanwhile, according to another embodiment of the invention, a method for preparing cerium oxide comprising forming cerium carbonate by the above explained method; and, firing the cerium carbonate is provided.

The firing temperature and firing method of cerium carbonate may be commonly known temperature and method for preparing cerium oxide. For example, the firing temperature may be about 400° C. to 1000° C., preferably about 500° C. to 900° C., and the firing may be conducted for about 30 minutes~4 hours, preferably about 1 to 3 hours. If the firing temperature is too low or the firing time is too short, crystallinity of the cerium oxide may be lowered, and the cerium oxide may not exhibit polishing speed suitable for use as CMP abrasive. And, if the firing temperature is too high or the firing time is too long, the crystallinity of the cerium oxide may be too high, and scratch may be caused on the polished surface when the cerium oxide is used as CMP abrasive.

The cerium oxide obtained by the above-explained method may exhibit desired physical properties, for example, desired polishing performance as CMP abrasive through the control of the crystal structure, shape, kind or size of the precursor cerium carbonate or the volume ratio. For example, cerium oxide prepared using hexagonal cerium carbonate as main precursor material has high polishing speed to a silicon oxide film and low polishing speed to a silicon nitride film, thus having excellent polishing selectivity between the silicon oxide film and the silicon nitride film, as well as excellent global degree of planarization. To the contrary, cerium oxide prepared using orthorhombic cerium carbonate as main precursor material may exhibit favorable properties for polishing a silicon nitride film with high strength.

As explained, according to the present invention, a method for preparing cerium carbonate that can prepare cerium carbonate with high yield and productivity is provided. According to the method, cerium carbonate having desired crystal structure, kind, shape and size may be easily selectively prepared. And, cerium carbonate having more uniform diameter may be prepared by the method.

Accordingly, cerium oxide having more preferable properties as CMP abrasive and the like may be easily prepared using the cerium carbonate. Specifically, cerium oxide prepared from the cerium carbonate may be preferably used as CMP abrasive in the process of manufacturing semiconductor with narrow line width.

The present invention is further explained in more detail with reference to the following examples. These examples, however, should not be interpreted as limiting the scope of the present invention in any manner.

Example 1

600 g of cerium nitrate ($Ce(NO_3)_3 \cdot xH_2O$) and 250 g of urea (3 equivalent) were introduced a glass reactor with a volume of 1 L and mixed at atmospheric pressure (1 atm), and the temperature of the mixture was elevated to 80~100° C. The solid was molten as the result of temperature elevation, and agitation was initiated. At this time, polyethylene glycol having weight average molecular weight of 300 was added in the content of 20 wt %, based on the weight of the cerium nitrate. Then, water was evaporated and removed, the temperature was elevated to 140° C. and the reaction was conducted for 5 hours, and the mixture was slowly cooled. And then, water was introduced to dilute the mixture, and the reaction was completed. The amount and yield of the obtained cerium carbonate are 284 g and 95%.

Figure 7:
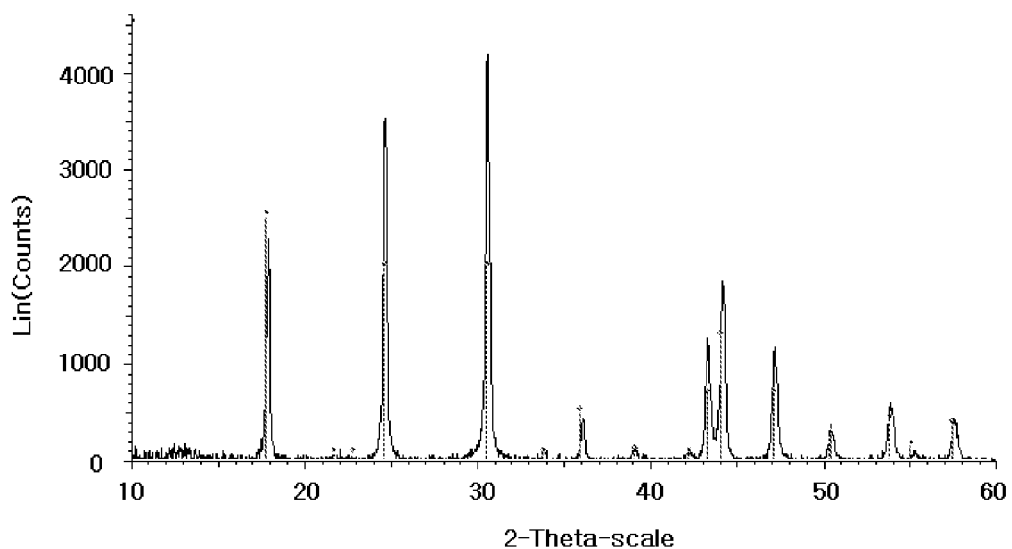
FIG. 7 is XRD analysis result of cerium carbonate obtained in Example 1.

The shape and crystal structure of cerium carbonate are confirmed through electron microscope image and X-ray diffraction analysis, and the electron microscope image and the X-ray diffraction spectrum are respectively shown in FIG. 1 and FIG. 7.

As shown in FIG. 1 and FIG. 7, it is confirmed that cerium carbonate of Example 1 has uniform diameter and comprises only cerium carbonate of a hexagonal crystal structure (100 vol %).

Example 2

600 g of cerium nitrate ($Ce(NO_3)_3 \cdot xH_2O$) and 250 g of urea (3 equivalent) were introduced in a glass reactor with a volume of 1 L and mixed at atmospheric pressure (1 atm), and the temperature of the mixture was elevated to 80~100° C. The solid was molten as the result of temperature elevation, and agitation was initiated. At this time, polyethylene glycol having weight average molecular weight of 600 was added in the content of 20 wt %, based on the weight of the cerium nitrate. Then, water was evaporated to remove, the temperature was elevated to 140° C. and the reaction was conducted for 5 hours, and the mixture was slowly cooled. And then, water was introduced to dilute the mixture, and the reaction was completed. The amount and yield of the obtained cerium carbonate are 290 g and 96%.

Figure 2:
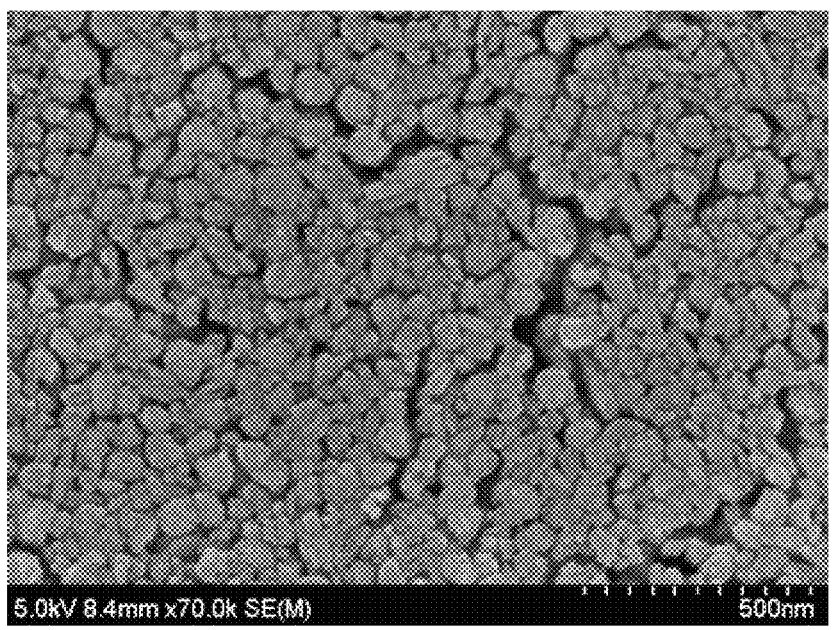
FIG. 2 is a magnified SEM image of cerium carbonate obtained in Example 2.

The shape and crystal structure of cerium carbonate are confirmed through electron microscope image and X-ray diffraction analysis, and the electron microscope image is shown in FIG. 2.

As shown in FIG. 2, it is confirmed that cerium carbonate of Example 2 has uniform diameter, and it is also confirmed that it comprises only cerium carbonate of a hexagonal crystal structure (100 vol %) by the X-ray diffraction spectrum.

Example 3

600 g of cerium nitrate ($Ce(NO_3)_3 \cdot xH_2O$) and 250 g of urea (3 equivalent) were introduced in a glass reactor with a volume of 1 L and mixed at atmospheric pressure (1 atm), and the temperature of the mixture was elevated to 80~100° C. The solid was molten as the result of temperature elevation, and agitation was initiated. At this time, polyethylene glycol having weight average molecular weight of 10000 was added in the content of 20 wt %, based on the weight of the cerium nitrate. Then, water was evaporated to remove, the temperature was elevated to 140° C. and the reaction was conducted for 5 hours, and the mixture was slowly cooled. And then, water was introduced to dilute the mixture, and the reaction was completed. The amount and yield of the obtained cerium carbonate are 286 g and 95%.

Figure 3:
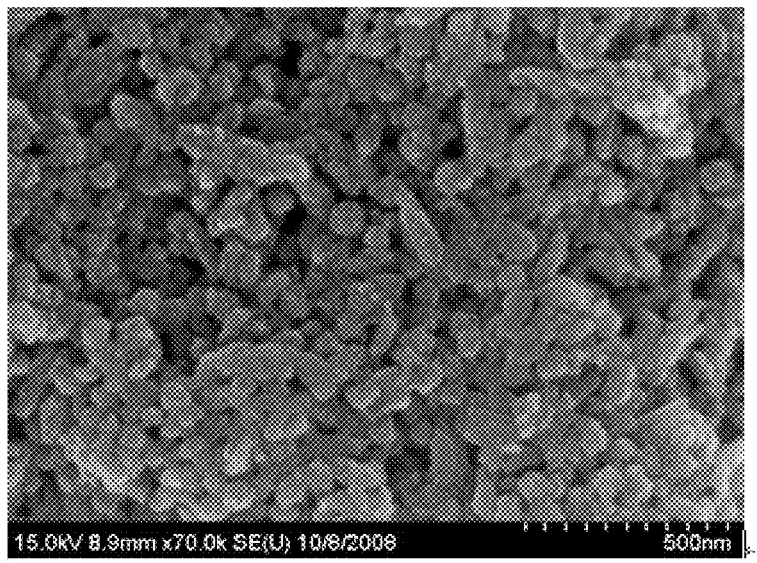
FIG. 3 is a magnified SEM image of cerium carbonate obtained in Example 3.

The shape and crystal structure of cerium carbonate are confirmed through electron microscope image and X-ray diffraction analysis, and the electron microscope image is shown in FIG. 3.

As shown in FIG. 3, it is confirmed that cerium carbonate of Example 3 has uniform diameter, and it is also confirmed that it comprises only cerium carbonate of a hexagonal crystal structure (100 vol %) by the X-ray diffraction spectrum.

Example 4

600 g of cerium nitrate ($Ce(NO_3)_3 \cdot xH_2O$) and 250 g of urea (3 equivalent) were introduced in a glass reactor with a volume of 1 L and mixed at atmospheric pressure (1 atm), and the temperature of the mixture was elevated to 80~100° C. The solid was molten as the result of temperature elevation, and agitation was initiated. At this time, polyvinyl pyrrolidone having weight average molecular weight of 10000 was added in the content of 20 wt %, based on the weight of the cerium nitrate. Then, water was evaporated to remove, the temperature was elevated to 140° C. and the reaction was conducted for 5 hours, and the mixture was slowly cooled. And then, water was introduced to dilute the mixture, and the reaction was completed. The amount and yield of the obtained cerium carbonate are 288 g and 95%.

Figure 4:
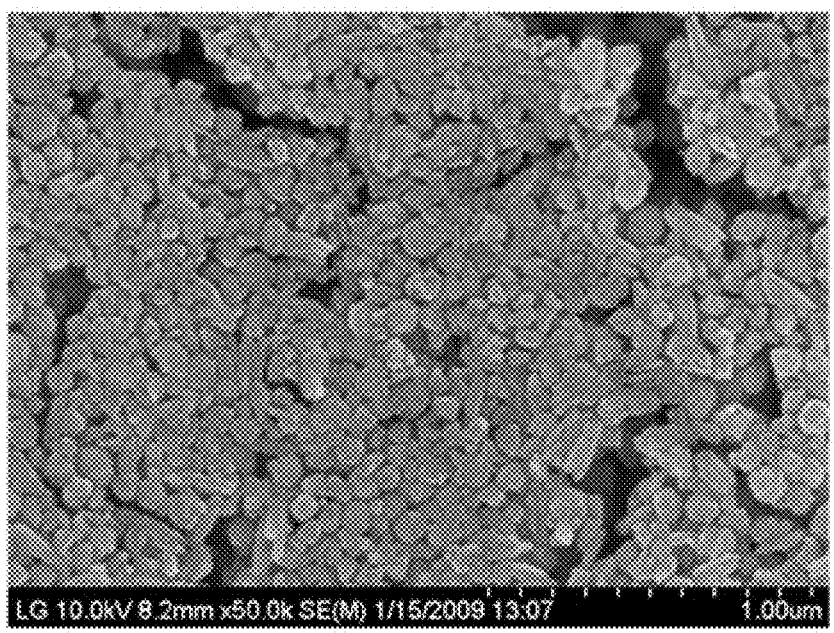
FIG. 4 is a magnified SEM image of cerium carbonate obtained in Example 4.

The shape and crystal structure of cerium carbonate are confirmed through electron microscope image and X-ray diffraction analysis, and the electron microscope image is shown in FIG. 4.

As shown in FIG. 4, it is confirmed that cerium carbonate of Example 4 has uniform diameter, and it is confirmed also that it comprises only cerium carbonate of a hexagonal crystal structure (100 vol %) by the X-ray diffraction spectrum.

Example 5

600 g of cerium nitrate ($Ce(NO_3)_3 \cdot xH_2O$) and 250 g of urea (3 equivalent) were introduced in a glass reactor with a volume of 1 L and mixed at atmospheric pressure (1 atm), and the temperature of the mixture was elevated to 80~100° C. The solid was molten as the result of temperature elevation, and agitation was initiated. At this time, polyacrylic acid having weight average molecular weight of 7000 was added in the content of 20 wt %, based on the weight of the cerium nitrate. Then, water was evaporated to remove, the temperature was elevated to 140° C. and the reaction was conducted for 5 hours, and the mixture was slowly cooled. And then, water was introduced to dilute the mixture, and the reaction was completed. The amount and yield of the obtained cerium carbonate are 277 g and 94%.

Figure 5:
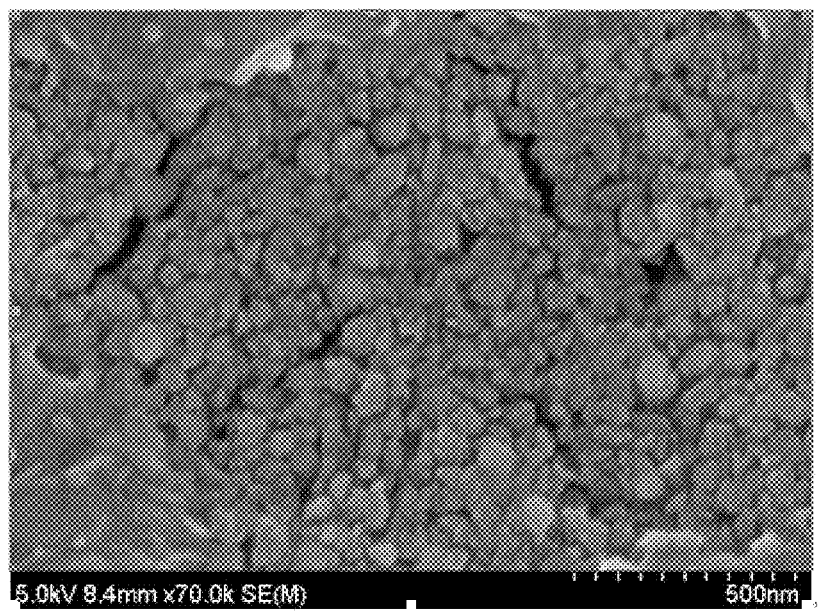
FIG. 5 is a magnified SEM image of cerium carbonate obtained in Example 5.

The shape and crystal structure of cerium carbonate are confirmed through electron microscope image and X-ray diffraction analysis, and the electron microscope image is shown in FIG. 5.

As shown in FIG. 5, it is confirmed that cerium carbonate of Example 5 has uniform diameter, and it is also confirmed that it comprises only cerium carbonate of a hexagonal crystal structure (100 vol %) by the X-ray diffraction spectrum.

Comparative Example 1

Cerium nitrate ($Ce(NO_3)_3 \cdot xH_2O$) 370 g, urea 154 g (3 equivalent) were dissolved in 170 ml of ionized water, introduced in a glass reactor with a volume of 1 L and mixed, and polyethylene glycol (PEG) having weight average molecular weight of 10000 was added in the content of 20 wt %, based on the weight of the cerium nitrate while agitating. Then, the temperature was elevated to 100° C. and the reaction was conducted for 4 hours, and the mixture was slowly cooled. And then, water was introduced to dilute the mixture, and the reaction was completed. The amount and yield of the obtained cerium carbonate are 160 g and 93%.

Referring to Examples 1 to 5, it is confirmed that cerium carbonate having uniform diameter may be obtained with high yield and amount (productivity) by reacting the cerium precursor and urea in the absence of a separate reaction medium.

And, as shown in Examples 1 to 5, it is confirmed that hexagonal cerium carbonate may be selectively prepared by easily progressing a high temperature reaction without need to progress a high pressure reaction.

To the contrary, in Comparative Example 1, the amount product of cerium carbonate is not high in a reactor of the same volume, thus confirming that productivity is not high.

Experimental Example

Measurement of Particle Size Distribution of Cerium Carbonate

A particle size analysis of the cerium carbonate obtained in Examples 1 to 5 was conducted using a particle size analyzer (LA910) of Horiba Company. From the result of the particle size analysis, volume mean diameter and standard deviation of diameter of cerium carbonate were obtained, which are summarized in the following Table 1. And, the particle size analysis result of Example 1 is as shown in FIG. 6.

TABLE 1

| | Average diameter (nm) | Standard deviation of diameter (nm) |
|---|---|---|
| Example 1 | 90 | 6 |
| Example 2 | 85 | 5 |
| Example 3 | 70 | 7 |
| Example 4 | 87 | 7 |
| Example 5 | 75 | 7 |
| Comparative Example 1 | 300 | 30 |

Figure 6:
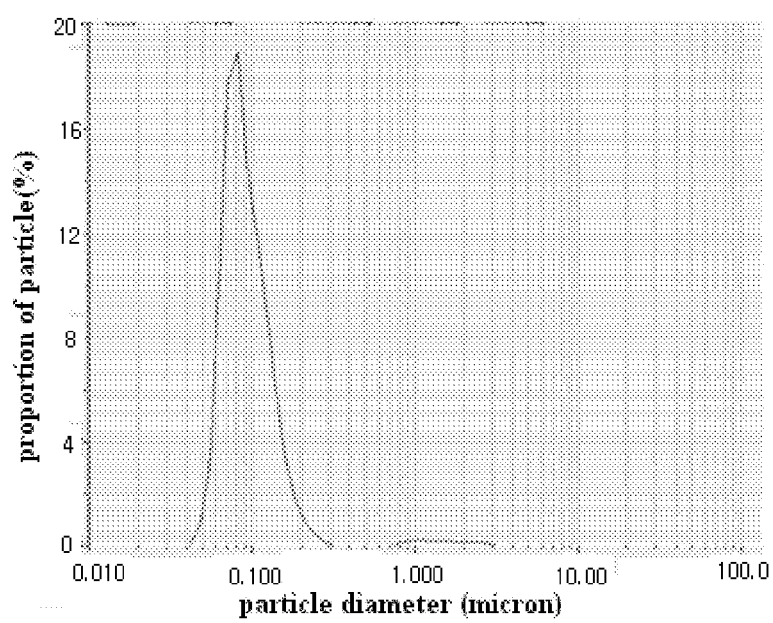
FIG. 6 is a graph showing the result of particle size analysis of cerium carbonate obtained in Example 1.

Referring to the Table 1 and FIG. 6, it is confirmed that the cerium carbonate obtained in Examples 1 to 5 may have very small uniform diameter with average particle diameter of 80~90 nm, particularly very narrow particle size distribution, and standard deviation of diameter of 5~7 nm.

Therefore, it is confirmed that cerium carbonate having desired diameter may be uniformly obtained in Examples 1 to 5, and it is expected that cerium oxide having excellent physical properties may be obtained using the cerium carbonate.

Example 6

Cerium oxide was prepared by firing the cerium carbonate prepared in Example 1 at 900° C. using a continuous heating furnace.

50 g of the cerium oxide was mixed with 330 g of water and a dispersant (polyacrylic acid: added in the concentration of 3 wt %, based on water), and then, the mixture was pulverized at 500 rpm for 3 hours using a ball mill.

Particle size analysis of the pulverized cerium oxide was conducted using a particle size analyzer (LA910) of Horiba Company. The graph derived from the result of the particle size analysis is as shown in FIG. 8.

Figure 8:
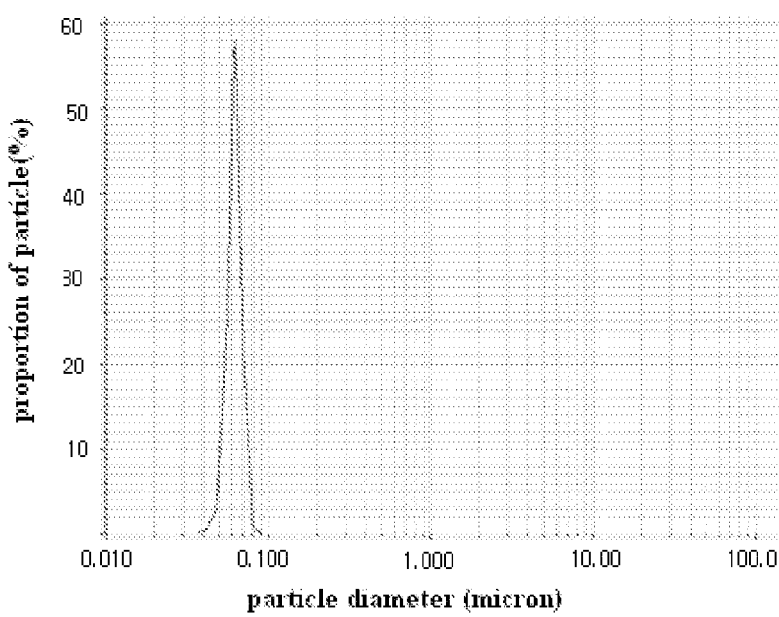
FIG. 8 is a graph showing the result of particle size analysis of pulverized cerium oxide obtained in Example 6.

Referring to FIG. 8, it is confirmed that the cerium oxide of Example 6 has very small and uniform diameter with fine average particle diameter of about 60 nm, particularly very narrow particle size distribution, and standard deviation of diameter of about 6 nm, even after pulverization with a ball mill for a short time.

This results from the uniform diameter of cerium carbonate that is a precursor of cerium oxide, and it is expected that the cerium oxide may exhibit excellent polishing properties as CMP abrasive due to the uniform and fine particle diameter.

What is claimed is:

1. A method for preparing cerium carbonate comprising:
   mixing a cerium precursor and urea; and
   elevating the temperature of the mixture to 50° C. or more to react the cerium precursor with urea in the presence of a polymer dispersant,
   wherein the cerium precursor and urea are reacted with each other in the presence of an organic solvent, aqueous solvent or other liquid medium in a quantity of 5 wt % or less based on the total weight of the cerium precursor and urea.

2. The method according to claim 1, wherein the cerium precursor and urea are mixed in a solid state.

3. The method according to claim 1, wherein the cerium precursor comprises cerium nitrate, sulfate, chloride, acetate or ammonium salt.

4. The method according to claim 1, wherein the polymer dispersant is selected from the group consisting of polyethyleneglycol, polyacrylic acid, polyvinyl alcohol, polyvinyl pyrrolidone, and a combination thereof.

5. The method according to claim 1, wherein the polymer dispersant has a weight average molecular weight of 200 to 100,000.

6. The method according to claim 1, wherein the polymer dispersant is added to the mixture of which temperature is elevated to react the cerium precursor with urea.

7. The method according to claim 6, wherein during reaction of the cerium precursor with urea, water derived from the cerium precursor in the form of a hydrate is removed.

8. The method according to claim 1, wherein the reaction of the cerium precursor and urea is conducted at an elevated temperature of 80~250° C.

9. The method according to claim 1, wherein the reaction of the cerium precursor and urea is conducted under pressure of 1~3 atm.

10. The method according to claim 1, wherein the cerium precursor and urea is mixed in the equivalent ratio of 1:0.5~1:10.

11. The method according to claim 1, wherein the polymer dispersant is used in the content of 10 to 30 wt %, based on the weight of the cerium precursor.

12. The method according to claim 1, wherein the cerium precursor and urea is reacted for 0.5~60 hours.

13. The method according to claim 1, wherein the reaction of the cerium precursor and urea is conducted in the presence of nitric acid.

14. The method according to claim 13, wherein the reaction of the cerium precursor and urea is conducted at an elevated temperature of 50~250° C.

15. A method for preparing cerium oxide comprising:
    (a) forming cerium carbonate by a method comprising:
    mixing a cerium precursor and urea; and
    elevating the temperature of the mixture to 50° C. or more in the absence of a separate reaction medium to react the cerium precursor with urea in the presence of a polymer dispersant; and
    (b) firing the cerium carbonate.

16. The method for preparing cerium oxide according to claim 15, wherein the firing is conducted at a temperature of 400° C. to 1000° C.

* * * * *